United States Patent Office 3,393,237
Patented July 16, 1968

3,393,237
PREPARATION OF CYCLOHEXYL-
HYDROXYLAMINE
Joseph Charles Forman, Lake Bluff, and Morris Freifelder, Waukegan, Ill., assignors to Abbott Laboratories, North Chicago, Ill., a corporation of Illinois
No Drawing. Filed Sept. 22, 1965, Ser. No. 489,375
6 Claims. (Cl. 260—563)

ABSTRACT OF THE DISCLOSURE

Cyclohexylhydroxylamine is prepared by hydrogenating nitrocyclohexane in the presence of palladium or platinum and in the presence of a selectivity agent at a temperature between room temperature and 100° and at super-atmospheric hydrogen pressure.

The present invention is directed to the preparation of cyclohexylhydroxylamine; more particularly it is directed to a catalytic hydrogenation process for the preparation of cyclohexylhydroxylamine from nitrocyclohexane.

In the past, various routes have been described for the preparation of cyclohexylhydroxylamine using nitrocyclohexane as a starting material. These processes use various catalysts for the hydrogenation, but special techniques were necessary in each instance to prevent the reaction from continuing to form the completely hydrogenated product, cyclohexylamine. One of these techniques requires the interruption of the hydrogenation after two moles of hydrogen are absorbed; another practice consists in recirculating a slow stream of nitrocyclohexane over a catalyst bed and continuously removing the formed cyclohexylhydroxylamine from the reaction mixture; another practice consists in using a low catalyst ratio and low temperatures to cause a very slow reaction rate in order to enable interrupting the reaction when cyclohexylhydroxylamine is formed. All of these techniques are either uneconomic because of the slow reaction rate or impractical because the reaction has to be interrupted at a very specific reaction point in order to obtain a good yield and to prevent excessive formation of unwanted cyclohexylamine.

It is thus an object of the present invention to provide a practical process for the preparation of cyclohexylhydroxylamine from nitrocyclohexane by catalytic hydrogenation. It is a particular object to provide a process for the preparation of cyclohexylhydroxylamine by catalytic hydrogenation of nitrocyclohexane which does not require the interruption of the process at a specific instant. It is a further object of the present invention to provide a catalytic hydrogenation process for nitrocyclohexane leading to cyclohexylhydroxylamine in which the latter is obtained in good yields and at a fast reaction rate. A still further object of the present invention is to provide a catalytic hydrogenation process for the conversion of nitrocyclohexane to cyclohexylhydroxylamine which substantially stops of its own accord or which produces a significant drop in the hydrogen absorption rate when two molar equivalents of hydrogen are absorbed, thus forming cyclohexylhydroxylamine at an economical and practical reaction speed.

These and other objects are accomplished by the process of preparing cyclohexylhydroxylamine consisting essentially in the step of selectively hydrogenating a solution of nitrocyclohexane in the presence of a catalyst selected from the group consisting of palladium and platinum, said catalyst being present in an amount of from 0.025 to 0.25% by weight of said nitrocyclohexane, and in the presence of a selectivity agent, said selectivity agent being present in an amount of at least 1% by weight of the amount of said nitrocyclohexane, at a temperature of between room temperature and 100° C., and at a super-atmospheric hydrogen pressure below 100 p.s.i.g.

The term "selectivity agent" used above and hereinafter is defined as a saturated primary, secondary or tertiary organic amine having a $pK_a$=value of at least 9.5. The term thus defines strong bases including aliphatic compounds such as amylamine and triethylamine, saturated heterocyclic compounds such as piperazine, piperidine, lupetidine and morpholine and alicyclic amines such as cyclohexylamine, etc. These materials produce the surprising effect of drastically reducing the absorption of hydrogen when two moles are taken up during the reaction. In many instances, these organic bases completely stop the reaction at this point.

Operating under the above conditions, the reaction proceeds very rapidly until two molar equivalents of hydrogen are absorbed. At that point, the absorption stops or slows down very drastically. For instance, at 90° C. and in the presence of 0.05% of palladium with a hydrogen pressure below 60 p.s.i.g., the theoretical amount of two molar equivalents of hydrogen is absorbed in less than 2 hours, after which time further hydrogen uptake becomes extremely slow, enabling even an unskilled operator to interrupt the reaction at the proper time.

The hydrogenation may be carried out in the presence of hydrogenation solvents which are miscible with nitrocyclohexane, e.g. alcohols, liquid hydorcarbons and the like, or in certain instances the above-defined selectivity agent may serve as the reaction solvent.

The above-defined amines have a suprising selective effect on the hydrogenation reaction which in the absence of such an amine goes beyond the absorption of two moles of hydrogen per mole of nitrocyclohexane leading to the formation of cyclohexylamine. Expressed differently, the reaction between nitrocyclohexane and hydrogen which ordinarily produces cyclohexylamine in the presence of a noble metal catalyst selectively stops at the stage where cyclohexylhydroxylamine is formed when an amine of the above definition is present in an amount of at least 1% by weight based on the amount of nitrocyclohexane.

The new process is thus advantageous in many respects; particularly it produces cyclohexylhydroxylamine in good yields and at a fast reaction speed; it prevents over-hydrogenation with a minimum or no cyclohexylamine being formed as by-product and without the necessity of inherrupting the reaction at a specific point. It is particularly surprising to note that the hydrogenation takes place in the presence of amines of the above definition, since many of the compounds falling within this class are ordinarily considered catalyst poisons preventing catalytic hydrogenations.

In a general embodiment of the present invention, 100 parts of nitrocyclohexane are dissolved in 300–1000 parts of ethyl alcohol containing 1–50 parts of piperidine and 0.5–2 parts of a catalyst containing 5% of palladium or platinum on a carrier such as carbon, silica gel, kieselguhr, bentonite, alumina, etc., and this mixture is hydrogenated at a temperature of between 40 and 90° C. and with a hydrogen pressure of between 15 and 100 p.s.i.g. After the hydrogen absorption rate decreases drastically, the hydrogenation is interrupted and the catalyst is removed preferably by hot filtration. When operating in the presence of a relatively small amount of solvent, additional solvent may be added to dissolve all of the formed cyclohexylhydroxylamine. Upon removal of the catalyst from the hot solution, cyclohexylhydroxylamine crystallizes in the filtrate upon cooling. Additional amounts of cyclohexylhydroxylamine can be recovered from the filtrate by concentrating the supernatant under reduced pressure.

In a preferred embodiment, 100 parts of nitrocyclohexane are dissolved in 300–600 parts of cyclohexylamine and the reaction is carried out as above but with no need of an additional solvent. Upon completion of the reaction, the cyclohexylhydroxylamine is recovered from the cyclohexylamine in the above-described fashion in excellent yield and excellent quality. The additional advantage of this embodiment is the fact that cyclohexylamine is used as the solvent and simultaneously as the selectivity agent. Furthermore, the cyclohexylamine used as the solvent can be recovered and reused for further batches without additional purification steps. In all instances, the catalyst can be reused for additional batches without regeneration.

Since cyclohexylhydroxylamine is not particularly soluble in many of the organic solvents used and since it is a material which is sensitive to heat in the presence of oxygen, it is advantageous to have sufficient solvent present in the reaction vessel to enable the removal of the catalyst without prolonged heating of the reaction mixture. It will also be noted that only a specific amount of catalyst should be used in the present reaction. Amounts of less than 0.025% of metallic palladium or platinum produce a reaction rate which requires longer reaction times which in turn tends to lower the overall yield due to the sensitivity of cyclohexylhydroxylamine to prolonged heating. On the other hand, catalyst amounts above 0.25% may be so active that the selectivity agent may lose part of its effect. However, amounts above the 0.25% level may be used if larger amounts of the selectivity agent are present, particularly when the selectivity agent is used as the reaction medium as shown in the above preferred embodiment.

In order to illustrate the above procedure, reference is made to the following examples which are not intended to limit the invention in any respect.

Example 1

A mixture of 32.3 g. (0.25 g. mole) nitrocyclohexane, 200 ml. cyclohexylamine and 0.323 g. of a catalyst containing 5% palladium deposited on activated charcoal are placed in a Parr shaker bottle. The bottle is evacuated, filled and purged several times with hydrogen, and agitation is then started. The temperature of the bottle is raised to 90° C.; the pressure is maintained in a range between 30 and 60 p.s.i.g. averaging 50 p.s.i.g.

The reaction rate, as measured by hydrogen uptake is rapid at the beginning. After one hour, 75% of the theoretical hydrogen for production of cyclohexylhydroxylamine is taken up; the theoretical amount is absorbed in slightly over one and one-half hours. At about this point, the reaction rate slows greatly.

After cooling the product is removed from the bottle and the catalyst is filtered. Analysis of the filtrate shows a virtually quantitative yield of cyclohexylhydroxylamine (based on nitrocyclohexane reacted).

The product is recovered by stripping off cyclohexylamine under vacuum, then filtering, washing, and drying the crystalline cyclohexylhydroxylamine.

Example 2

To a solution of 12.9 g. of nitrocyclohexane in 50 ml. of ethyl alcohol is added 0.2 ml. of piperidine and 0.25 g. of 5% palladium-on-carbon. This mixture is hydrogenated at room temperature under a maximum hydrogen pressure of 36 p.s.i.g. The hydrogenation is allowed to proceed overnight but stops at an uptake of 2 molar equivalents of hydrogen. Eight ml. of glacial acetic acid is added to the reaction mixture which is then filtered, and the filtrate is evaporated under reduced pressure. The residue is dissolved in 25 ml. of water and neutralized with sodium bicarbonate. The precipitate is filtered and washed with water producing a yield of 6 gm. of cyclohexylhydroxylamine melting at 140° C.

Example 3

A solution of 19.35 g. of nitrocyclohexane in 50 ml. of 95% ethyl alcohol and 1 ml. of piperidine is hydrogenated in the presence of 0.5 g. of a 5% palladium-on-carbon catalyst at 60° C. and a maximum hydrogen pressure of 45 p.s.i.g. Hydrogen uptake stops after 6 hours. The thick reaction mass is diluted with 100 ml. of alcohol and heated to remove the catalyst in a hot filtration. The filtrate produces 12.0 g. of cyclohexylhydroxylamine melting at 143° C. The mother liquor contains some unreacted nitrocyclohexane.

When in the above example the amount of piperidine is increased to 3 ml., essentially the same result is obtained.

Example 4

A mixture of 25.8 g. of nitrocyclohexane, 50 ml. of piperidine and 0.3 g. of 5% palladium-on-carbon is hydrogenated at 65° C. with a maximum hydrogen pressure of 40 p.s.i.g. Hydrogen uptake stops at two molar equivalents in 2 hours. The reaction is diluted with 200 ml. of alcohol and heated to remove the catalyst through hot filtration. The above recovery procedure produces 14.9 g. of crystalline cyclohexylhydroxylamine melting at 143° C. with some unreacted nitrocyclohexane remaining in the filtrate.

Example 5

A mixture of 25.8 g. of nitrocyclohexane, 100 ml. of 95% ethyl alcohol, and 2 ml. of piperidine is hydrogenated in the presence of 0.3 g. of 5% platinum-on-carbon under a hydrogen pressure of 45 p.s.i.g. at 60° C. The usual workup procedure produces 11 g. of crystalline cyclohexylhydroxylamine.

Examples 6–9

The procedure of Example 4 is repeated using a maximum hydrogenation pressure of 40 p.s.i.g. temperatures of 60–70° C. and the selectivity agents as listed below producing the following yields:

| Example Number | Selectivity Agent | Time | Yield, percent |
|---|---|---|---|
| 6 | Amylamine | 4 hrs | 67 |
| 7 | Di-n-propylamine | Overnight | 58 |
| 8 | Triethylamine | do | 46 |
| 9 | Morpholine | 3½ hrs | 70 |

Examples 10–16

The procedure of Example 1 is repeated with the following parameters and results

| Ex. No. | $C_6H_{11}NO_2$ (g.) | $C_6H_{11}NH_2$ (ml.) | Catalyst | Conditions | Time, hrs. | $C_6H_{11}NHOH$ yield |
|---|---|---|---|---|---|---|
| 10 | 32.3 | 200 | 0.323 g. 5% Pd/C | 69° C., 60–30 p.s.i.g. | 2:28 | 100 |
| 11 | 32.3 | 200 | 0.323 g. 5% Pd/C | 89° C., 60–30 p.s.i.g. | 1:38 | 100 |
| 12 | 32.3 | 200 | 0.323 g. 1% Pd/C | 78° C., 60–30 p.s.i.g. | 6:37 | 76 |
| 13 | 32.3 | 200 | 0.323 g. 2% Pd/C | 78° C., 60–30 p.s.i.g. | 4:50 | 100 |
| 14 | 32.3 | 200 | 0.323 g. 5% Pd/C | 43° C., 60–30 p.s.i.g. | 15 | 95 |
| 15 | 32.3 | 100 | 0.323 g. 5% Pd/C | 90° C., 60–30 p.s.i.g. | 1:23 | 83 |
| 16 | 32.3 | 200 | 0.323 g. 5% Pd/C | 90° C., 30–15 p.s.i.g. | 7:21 | 75 |

As will be seen from the above examples, the hydrogenation reaction follows thermodynamic principles as expected: the reaction time increases with lower catalyst ratios, lower pressures or lower temperatures and may thus be at will set-up in a fashion to produce rapid hydrogen uptake. It will be apparent to those skilled in the art that the above-defined amount of catalyst can be present in any of the commercially available forms but is preferably used in combination with a catalyst carrier. The carrier may contain between 1 and 5% of the finely divided catalyst metal. However, good results are also obtained if platinum oxide is used as the catalyst.

Where a solvent is used as the hydrogenation medium in addition to the selectivity agent, it is preferred to use an organic liquid which boils above 50° C., preferably one with a boiling point above the selected reaction temperature in order to make most effective use of the hydrogen pressure. It is one of the additional advantages of the present process that it can be operated under so-called low pressure conditions, permitting the use of a simple Parr shaker, a still or other inexpensive equipment which withstands pressures up to 60 or 100 p.s.i.g.

An additional and surprising advantage of the present invention is the use of relatively high temperatures which in turn produces high reaction rates. Unlike the older older processes, the present process permits full hydrogenation in a batch operation at these elevated temperatures without the necessity of removing cyclohexylhydroxylamine as it is formed. Of course, the present process can easily be converted into a continuous process.

Others may practice the invention in any of the numerous ways which will be suggested to one skilled in the art by the present disclosure. All such practice of the invention is considered to be a part hereof provided it falls within the scope of the appended claims.

We claim:
1. The process of preparing cyclohexylhydroxylamine consisting essentially in the step of hydrogenating a solution of nitrocyclohexane in the presence of a catalyst selected from the group consisting of palladium and platinum, said catalyst being present in an amount of from 0.025 to 0.25% by weight of said nitrocyclohexane, and in the presence of a primary, secondary or tertiary amine with a $pK_a$-value of at least 9.5, said amine being present in an amount of at least 1% by weight of the amount of said nitrocyclohexane, at a temperature of between room temperature and 100° C. and a superatmospheric hydrogen pressure below 100 p.s.i.g.
2. The process of claim 1 wherein said amine is cyclohexylamine.
3. The process of claim 1 wherein said amine is piperidine.
4. The process of claim 1 wherein said amine is morpholine.
5. The process of claim 1 wherein said nitrocyclohexane is dissolved in ethyl alcohol.
6. The process of claim 1 wherein said catalyst is palladium supported on a carrier and said palladium is present in an amount of from 0.025 to 0.25% of the amount of nitrocyclohexane.

References Cited
UNITED STATES PATENTS 2,850,531   9/1958   Weston et al. _____ 260—563

FOREIGN PATENTS 945,447   7/1956   Germany.

CHARLES B. PARKER, *Primary Examiner.*

P. C. IVES, *Assistant Examiner.*